(12) United States Patent
Basse et al.

(10) Patent No.: US 11,086,971 B2
(45) Date of Patent: *Aug. 10, 2021

(54) METHOD AND APPARATUS FOR PORTABLY BINDING LICENSE RIGHTS TO CONTENT STORED ON OPTICAL MEDIA

(71) Applicant: Disney Enterprises, Inc., Burbank, CA (US)

(72) Inventors: Hanno Basse, Santa Monica, CA (US); Ian E. Harvey, Lake Forest, CA (US)

(73) Assignee: Disney Enterprises, Inc., Burbank, CA (US)

( * ) Notice: Subject to any disclaimer, the term of this patent is extended or adjusted under 35 U.S.C. 154(b) by 7 days.

This patent is subject to a terminal disclaimer.

(21) Appl. No.: 16/578,126

(22) Filed: Sep. 20, 2019

(65) Prior Publication Data
US 2020/0097637 A1 Mar. 26, 2020

Related U.S. Application Data

(63) Continuation of application No. 15/034,845, filed as application No. PCT/US2014/064164 on Nov. 5, 2014, now Pat. No. 10,460,081.

(60) Provisional application No. 61/900,296, filed on Nov. 5, 2013, provisional application No. 61/900,856, filed on Nov. 6, 2013.

(51) Int. Cl.
*G06F 21/10* (2013.01)
*H04L 29/06* (2006.01)

(52) U.S. Cl.
CPC .......... *G06F 21/10* (2013.01); *H04L 63/0428* (2013.01); *H04L 63/062* (2013.01); *H04L 63/0823* (2013.01); *G06F 2221/0704* (2013.01); *G06F 2221/2107* (2013.01); *H04L 2463/101* (2013.01)

(58) Field of Classification Search
USPC .......... 726/2, 21, 27, 36; 713/150, 163, 181; 380/255, 264, 276
See application file for complete search history.

(56) References Cited

U.S. PATENT DOCUMENTS

| | | | | |
|---|---|---|---|---|
| 7,568,096 B2* | 7/2009 | Evans | ..................... | H04L 63/10 713/157 |
| 7,631,361 B2* | 12/2009 | Yamamichi | ............. | G06F 21/10 380/228 |
| 8,261,360 B2* | 9/2012 | Murakami | ............ | H04L 9/0822 726/27 |

(Continued)

*Primary Examiner* — Sharif E Ullah
(74) *Attorney, Agent, or Firm* — Farjami & Farjami LLP

(57) ABSTRACT

There is provided a method to playback content in a ROM having a ROM ID. The method includes copying the content from the ROM to a RAM having a RAM ID, copying the ROM ID to a memory accessible to a RAM controller, transmitting a license request from the RAM controller to a license server, the license request comprising a RAM controller ID, the ROM ID and a request for a content license to play back the content from the RAM; receiving the content license including a right for the playback of the content from the RAM, and a content key, decrypting the content license by the RAM controller, according to the RAM controller secret associated with the RAM controller ID, to recover and provide the content key to a playback module, decrypting the content using the content key to generate a decrypted content, and playing back the decrypted content.

20 Claims, 6 Drawing Sheets

(56) References Cited

U.S. PATENT DOCUMENTS

2006/0005257 A1* 1/2006 Tohru ............... G11B 20/00086
                                                        726/27
2012/0233701 A1* 9/2012 Kidron ................. G06F 15/167
                                                        726/26

* cited by examiner

METHOD AND APPARATUS FOR PORTABLY BINDING LICENSE RIGHTS TO CONTENT STORED ON OPTICAL MEDIA

CROSS-REFERENCE TO RELATED APPLICATIONS

This application is a Continuation of U.S. application Ser. No. 15/034,845, filed May 5, 2016, which is a National Stage of International Application No. PCT/US14/64164, entitled "METHOD AND APPARATUS FOR PORTABLY BINDING LICENSE RIGHTS TO CONTENT STORED ON OPTICAL MEDIA," filed Nov. 5, 2014, which claims benefit of the following U.S. Provisional Patent Applications:

U.S. Provisional Patent Application No. 61/900,296, entitled "METHOD AND APPARATUS FOR PORTABLY BINDING LICENSE RIGHTS TO CONTENT STORED ON OPTICAL MEDIA," by Hanno Basse and Ian E. Harvey, filed Nov. 5, 2013; and U.S. Provisional Patent Application No. 61/900,586, entitled "METHOD AND APPARATUS FOR PORTABLY BINDING LICENSE RIGHTS TO CONTENT STORED ON OPTICAL MEDIA," by Hanno Basse and Ian E. Harvey, filed Nov. 6, 2013;

all of which applications are hereby incorporated herein.

BACKGROUND OF THE INVENTION

Field of the Invention

The present invention relates to systems and methods for disseminating content to users for, and in particular to a system and method for portably binding license rights to content stored in optical media.

Description of the Related Art

The digitization of audio visual media content such as television shows and movies has enabled viewers to purchase their own copies of such media content for personal enjoyment. Such media content may be disseminated via tangible media such as optical discs, or may be disseminated by downloading the digital media from a content server or kiosk to a writable medium for later playback. Unfortunately, the digitalization of such media content has also permitted large scale and widespread unauthorized dissemination and/or use. Such unauthorized dissemination and/or use deprive providers of the audio visual media content the economic benefit of authoring such material.

How to reduce such "piracy," while retaining the benefits of with spread and easy dissemination of digital media content remains a challenge. However, the ubiquitous nature of digital communications and other technologies permit the definition of new dissemination and protection paradigms that can permit widespread dissemination of digital media, while suppressing unlicensed use of such digital media. The disclosure that follows describes an apparatus and method employing such a paradigm.

BRIEF DESCRIPTION OF THE DRAWINGS

Referring now to the drawings in which like reference numbers represent corresponding parts throughout.

DETAILED DESCRIPTION OF PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Figure 1:
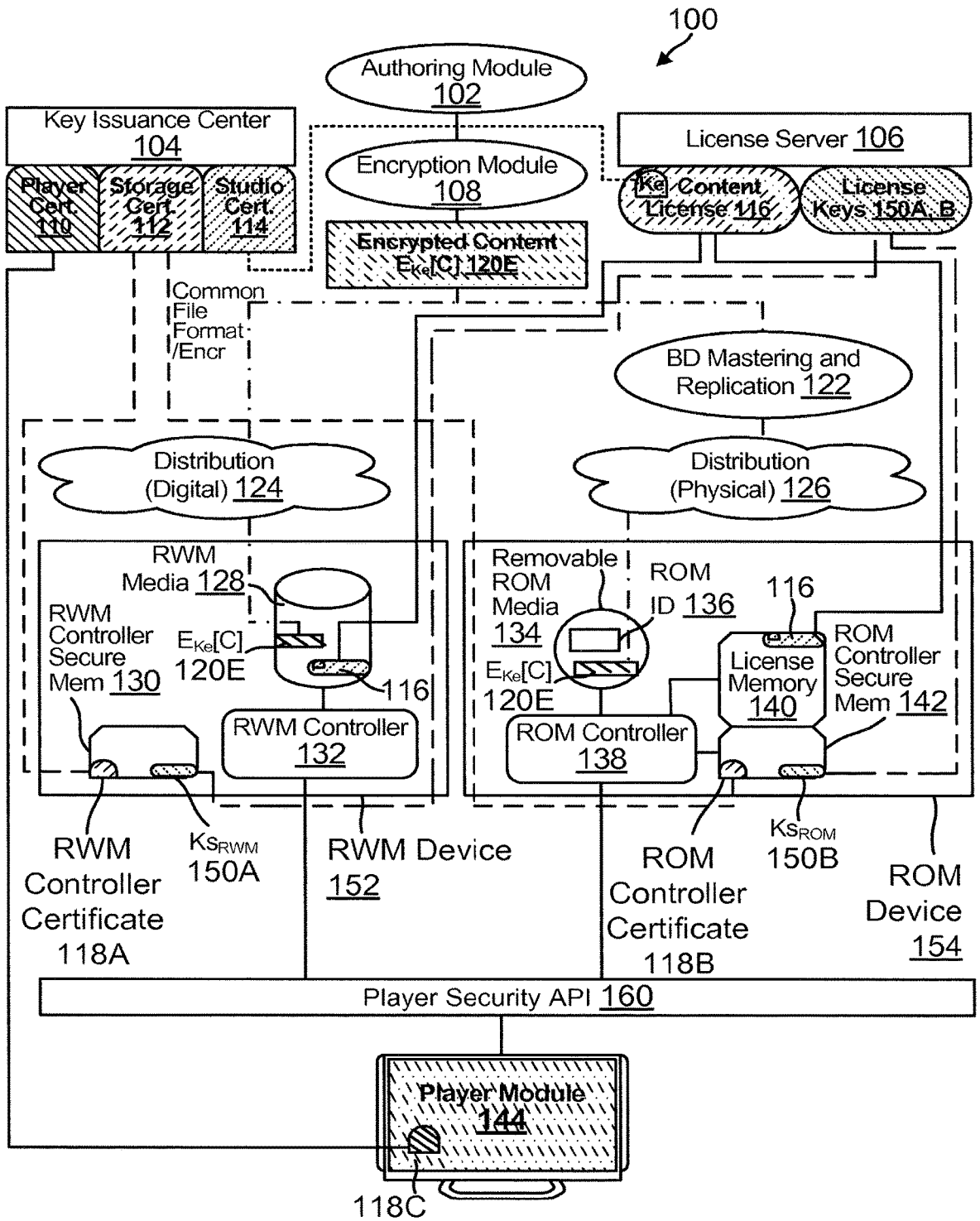
FIG. 1 is a block diagram shown an exemplary architecture for a content delivery system.

FIG. 1 is a diagram depicting an architectural representation of one embodiment of the content provisioning system CPS) 100. Digital content (C) 120 is prepared from a media program such as a movie title by authoring module 102. Before dissemination for playback, the content is provided to encryption module 108, and the content 120 is encrypted according so as to be decryptable by an encryption keys $K_e$, thus generating the encrypted content $E_{Ke}[C]$ 120E. In one embodiment, the content is encrypted so as to be decryptable by a single key $K_e$, however, other encryption schemes may also be used, including schemes where different portions of the content are encrypted such that multiple different keys, potentially in different combinations, are required to decrypt the content.

Once encrypted, distribution of the content may be accomplished in either by tangible or intangible means. Typical content distribution via intangible means comprises transmitting the content via a communications channel such as the Internet, cable satellite, or public switched telephone network (PSTN) to a storage device or memory that is accessible to a playback device.

Typical content distribution via, tangible means comprises distributing a tangible media or memory device storing the content to the user for playback on a compatible device, Tangible media may be further classified according to whether data can be only read from the media (read only memory (ROM)) or written to the media as well (read-writable media (RWM)), and still further classified according to whether the physical media storing the data is physically separable from the hardware controller used to read or read and write the data from/to the media. Hereinafter, media that can be removed from its associated controller is referred to as "removable media" and media that cannot be removed from its associated controller is referred to as "non-removable" media

Removable ROM Device

Returning to FIG. 1, the CPS 100 may include a read only memory (ROM) device 154 and/or a read/ rite memory (RWM) device 152. The ROM device 154 comprises a ROM controller 138 having a ROM secure controller memory 142 and a ROM license memory 140 that is used to store license information provided by the license server 106. The ROM controller 138 and associated ROM secure controller memory 142 work together to read data from the removable ROM media 134. As is set forth further below, a license key $^{Ks}$ROM 150B may be provisioned to the ROM controller secure memory 142 for secure storage therein. This license key $^{Ks}$ROM 150B is used to decrypt content licenses 116 provided by the license server 106 to the ROM controller 138, as set forth further below. This key $^{Ks}$ROM 150B is alternatively referred to as the ROM controller secret. The ROM controller secure memory 142 also stores ROM controller certificates provisioned by the Key Issuance Center 104.

Examples of removable ROM media 134 may include optical discs such as a DVDs, Bin-Ray discs, or firmware. Removable ROM media 134 may produced by a mastering and replication process 122 that replicates the encrypted version of the content 120E from a master to a copy that is sold or otherwise provided to customers or potential customers. Although it is possible to create some optical discs having the encrypted content 120E by a process analogous to the ripping and writing process used with read and writeable DVDs (R/WDVDs), DVDs and BluRay disks prepared for large scale commercial dissemination are essentially "stamped" from a master, much the same as 33 ⅓ long playing (LP) records are stamped from masters, and are therefore identical.

As discussed further below, each removable ROM media 134 may include a globally unique identifier of the removable ROM (ROM ID 136) that is typically unremovable and unchangeable. The ROM ID 136 allows identification of the removable ROM media 134 for purposes of granting and revoking specific rights associated with the content (including, for example, the right to play or copy the content).

One example of the ROM ID 136 is a portable media serial number (PMSN) that can be added to the removable ROM media 134 using a process distinct from the stamping process described above. This PMSN is similar to, but distinguished from the playback device serial number used with the PMSN service that is available on some WINDOWs operating systems.

Unlike the WINDOWS PMSN, the PMSN used in the CPS 100 shown in FIG. 1 is not a serial number associated with the media player, but rather, a unique and indelible identifier associated with the ROM media itself.

RWM Device

The GDS 100 may also comprise a RWM device 152 that can store the encrypted content $E_{Ke}[C]$ 120E. The RWM device 152 comprises a RWM controller 132 is used to read and write data from and to RWM media 128. The. RWM controller 132 may also include a RAM secure memory 130 that stores a license key 150A and one or more RAM controller digital certificate 118A securely provisioned by the license server 106. This RAM controller digital certificate 118A is used to enable secure communications between the RAM controller 132 and other entities of the CDS, including the player module 144A and the license server. The license key 150, also known as the RAM controller secret, is used to decrypt the encrypted content key Ke needed to decrypt the encrypted content 120E.

Examples of non-removable RWM 128 include hard disk drives (HDDs) which typically include an integrated HDD controller, and flash drives having built in controller circuitry and software. Examples of removable RWM include, for example, flash drives without built-in controller circuity and software and CD-RW optical disks. Importantly, the foregoing "removable" and "non-removable" designation refers to whether the memory media can be physically separated from the controller used to read from or read and write from/to the media. Hence, a backup drive that is used with a desktop computer via a universal serial bus (USB) connector is sill a non-removable RWM device 152, because even when the backup drive is removed from the host computer (e.g. by disconnecting the USB connector) the controller that manages the storing and reading of data from the media in the drive itself remains integrated with the memory media.

In one example, the encrypted content 120E is downloaded to the RWM media via a communication link with a distribution device 124 such as a content server storing the encrypted content 120E. For example, the non-removable RWM media 128 may comprise a hard disk drive (HDD) of a computer, and the encrypted content 120E may simply be downloaded from a content server to the HDD of the computer via the Internet. In another example, the non-removable RAM media 128 may comprise a flash drive or a portable hard drive with an integral controller module. Content can be stored on such devices either by coupling the device to a host computer and downloading the encrypted content 120E from a content server to the non-removable RWM media 128, or by coupling the non-removable RWM device 152 to a kiosk or similar device As discussed further below, it is possible for each RWM controller 132 to include a globally unique identifier or RAM controller ID. The RAM controller ID allows identification of the RWM device 152 for purposes of granting and revoking specific rights associated with the content (including, for example, the right to play or copy the content).

Content Playback

Figure 2:
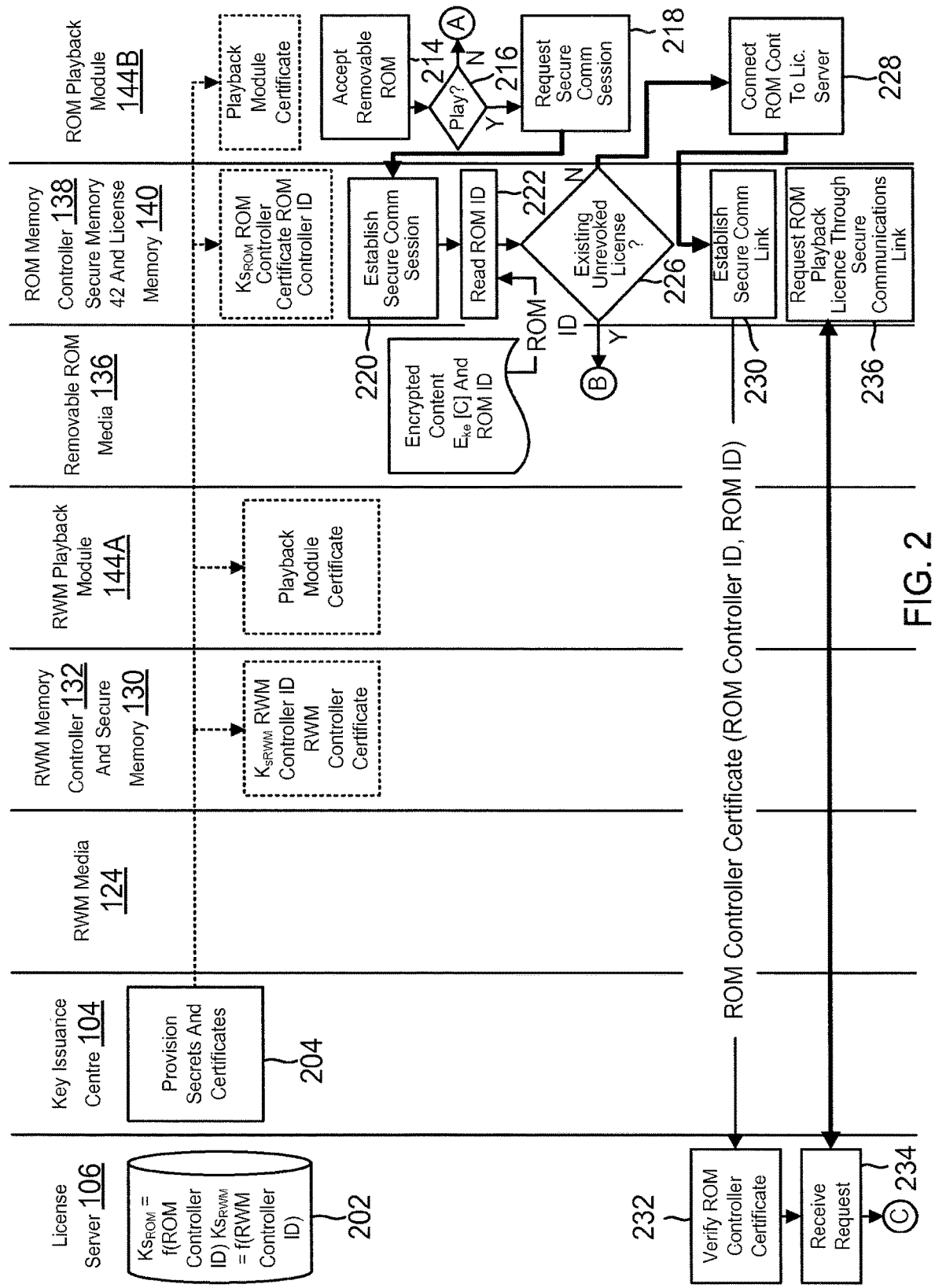
FIGS. 2-3 are flow charts illustrating exemplary processes for remotely enabling playback of content on a removable read only memory such as an optical disc.
Figure 3:
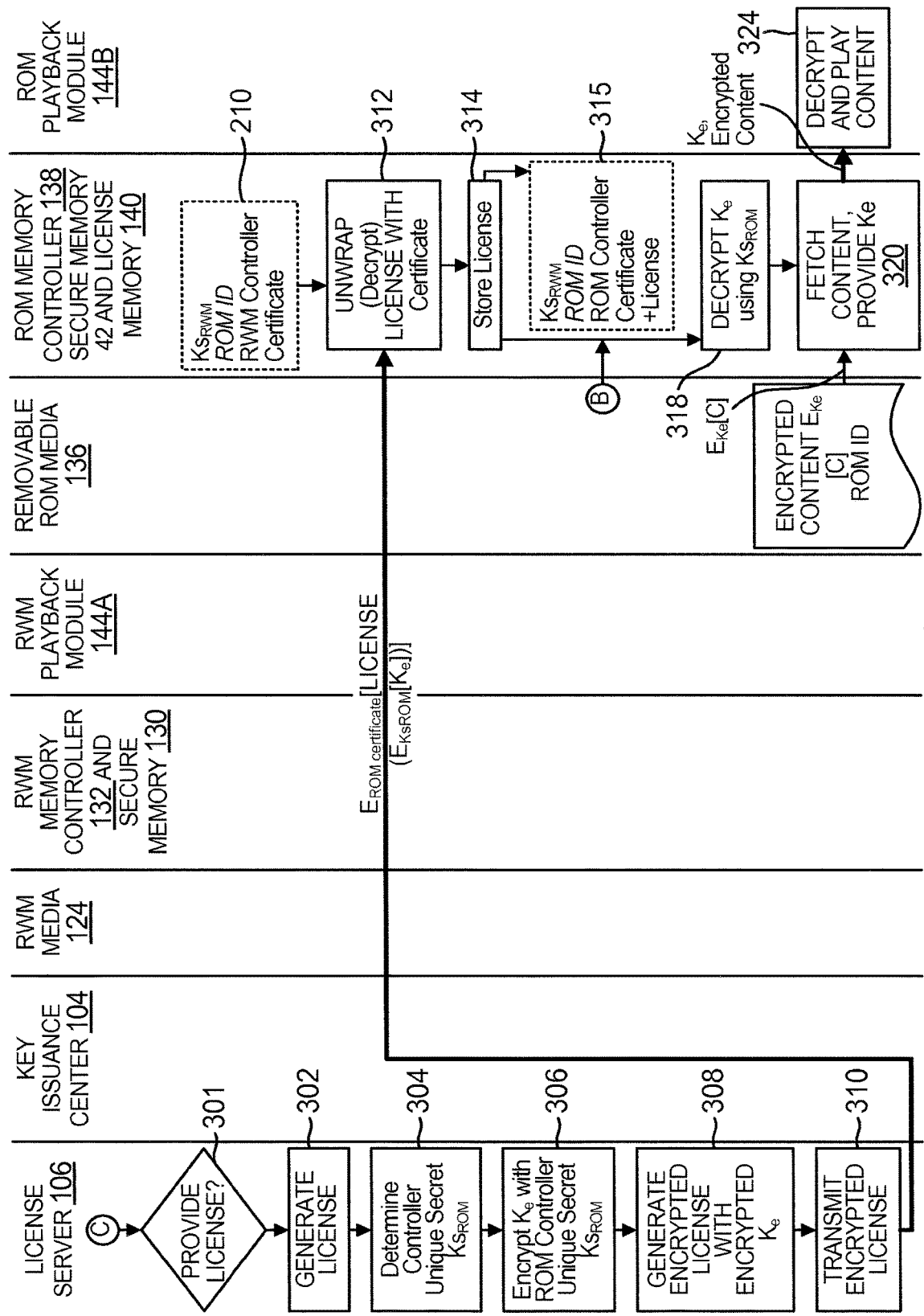

FIGS. 2-3 are flow charts illustrating exemplary processes for remotely enabling playback of content on a removable read only memory such as an optical disc.

In block 202, the license server 106 is provided with the ROM controller secret $^{Ks}$ROM 150B associated with the ROM controller 138 and the RWM controller secret $^{Ks}$RWM 150A associated with the RWM controller 132. The ROM controller secret $^{Ks}$ROM 150B and the RWM controller secret $^{Ks}$RWM 150A are typically installed by the manufacturer of the ROM controller 138 and RWM controller 130 respectively in secure memories 142 and 130, but may be provided by the key issuance center 104 or other entity.

In block 204, the key issuance center 104 provisions certificates 118A-118C to elements of the CDS 100. RWM controller certificate 118A is provisioned to the RWM secure controller memory 130 for storage, and ROM controller certificate 118B is provisioned to the ROM secure controller memory 142 for storage.

Block 204 also provisions a player certificate 118C to each content player module 144 (FIG. 1 illustrates a single content player module 144, while FIG. 2 includes two content player modules, 144A and 144B) to permit secure communications between the content player module(s) 144 and the controller providing the content to the player module 144 for playback, as described further below. The certificate 118C may be provided directly from the player certification authority 110, rather than through the player security application program interface (API) 160. Otherwise, the API 160 provides an interface between player module(s) 144 and the RWM device 152 and the ROM device 154.

The RWM disc controller 132 and ROM disc controller 138 may each also comprise a globally unique identifier. This identifier permits the RWM disc controller 132 and the ROM disc controller 138 to be uniquely identified, allowing the license server 106 pair the content with the controller used to play back the content, as further described below. The controller IDs may be simple serial numbers, read from a secure memory, or may be indelibly applied to the controllers 132, 138, for example, by burning fusible links in the controller circuitry. Once burned, the fusible links cannot be unburned, and a JTAG (Joint Test Action Group) fuse can be used to prevent further burning of additional fuses.

In block 214, a removable ROM media 134 having the encrypted content 120E is accepted in the ROM device 154. The removable ROM media 134 comprises an indelible ROM ID 136.

In block 216, a command is received to play the content on the removable ROM 134. The command may be a user command accepted by the ROM device 154, or can be the result of auto-play functionality. If the command is a command to play back the removable ROM, processing is routed to block 218.

In block 218, the ROM playback module 144B transmits a request to establish a secure communications session with the ROM controller 138, using the ROM controller certificate 118B and the playback module certificate 118C previously provisioned by the key issuance center 104. If the ROM playback module 144B is verified, a secure communication link is established between the ROM memory controller 138 and the ROM playback module 144B, as shown in blocks 218 and 220. As shown in block 222, the ROM controller 138 then reads the ROM ID 224 from the removable ROM media 134. In block 226, a determination is made (using the ROM ID 136) as to whether there is an existing content license 116 ahead stored in license memory 140 that can be used to playback the encrypted content 120E. If the license memory 140 includes an existing license, processing proceeds to block 318 as described further below. If the license memory 140 does not include a suitable license, processing is passed to block 228. In block 228, the ROM playback module 144B connects the ROM memory controller 138 to the license server 106. The ROM controller 138 then transmits a ROM playback license request to the license server 106, as shown in block 230.

In one embodiment, the ROM controller 138 and the license server 106 exchange certificates to establish the secure communications link as shown in blocks 230 and 232, and then the ROM controller 136 transmits a ROM playback license request that includes the ROM ID 136 and ROM controller ID. However, either or both of the ROM ID 136 and the ROM controller ID may be included with or embedded within the certificate transmitted in block 220 if desired. In any case, the license server 106 and the ROM controller 138 establish a secure communications link between each other, as shown in blocks 234 and 236 (optionally, via ROM playback module 144B), and use this link to request and provide the ROM playback license 116.

Turning now to FIG. 3, the license server 106 determines whether to provide the requested license, as shown in block 301. In one embodiment, the license server 106 will not provide a license if the ROM controller ID and/or the ROM ID 136 are not recognized, or if the ROM certificate 118B and ROM controller ID are inconsistent (e.g. the ROM certificate 118B associated with the secure session was not issued to a ROM controller 138 having the ROM controller ID received with the playback license request).

If it is determined not to provide a license, a message indicating that no license may be provided can be transmitted from the license server 106 to the playback module 114B via the ROM controller 138, and the playback module 114B can then present a suitable message to the user indicating that no license can be provided, If it is determined that a license can be provided, processing passes to block 302, where the license server 106 generates or retrieves a license including the requested playback license for the content associated with ROM ID 136.

The license server then binds the license 116 for the provided ROM ID 136 to the ROM controller certificate 118B, so that the license can only be decrypted by the ROM controller 138 whose certificate was used to request the license.

In one embodiment, this is implemented by encrypting the decryption keys $K_e$ necessary to decrypt the encrypted content with the ROM controller secret $^{Ks}$ROM 150B, with the ROM controller certificate 118B, or both. In block 302, the license server 106 generates a content license including a license to playback the content. In block 304, the license server 106 determines the ROM controller secret 150B that is associated with the ROM controller 138 that requested the license 1116, as determined by the provided ROM controller ID. In block 306, the key(s) K, needed to decrypt the encrypted content 120E is encrypted using the ROM controller secret $^{Ks}$ROM 150B, and this encrypted key $$E_{Ks_{ROM}} K_e$$

is included in the ROM playback license 116. In blocks 308 and 310, the playback license is encrypted using the ROM digital certificate 118B and transmitted to the ROM controller 138 for unwrapping (decryption) and use.

In block 312, the ROM controller 138 receives the encrypted license, and unwraps (decrypts) it using the ROM controller certificate 118B, thus providing the ROM controller 138 with access to the playback license needed to decrypt the requested encrypted content. As shown in blocks 314 and 315, the license 116B can be stored in the ROM controller secure memory 142 later use. The license 116B may be stored in its wrapped (encrypted) or unwrapped (unencrypted) state. If stored in the encrypted state, decryption and playback may be disabled by revoking the certificate of the ROM controller 138, as described further below.

The key(s) $K_e$ needed to decrypt the requested content is retrieved from the decrypted license and decrypted, using the ROM controller secret 150B as shown in block 318. In block 320, the ROM controller 138 fetches the encrypted content 120E from the removable ROM media 136, and provides the encrypted content 120E and the key(s) $K_e$ needed to decrypt that content to the ROM playback module 144B, as shown in blocks 320 and 322. The ROM playback module 144B then decrypts and plays the requested content, as shown in block 324.

It is important that the decryption key(s) $K_e$ be provided to the ROM playback module 144B via a secure communication path (as shown by the wide lines in the illustration), because each copy of the content is encrypted according to the same encryption key and hence, anyone in possession of that key $K_e$ can decrypt the encrypted content of any identical copy of the ROM media 134. However, the encrypted content itself can be transmitted from the ROM controller 138 via an unsecured communication link, as this information is encrypted.

The potential cost of compromising the decryption key $K_e$ may be ameliorated by issuing a number of different editions of the removable ROM 143, each having the content encrypted so as to be decryptable using a different decryption key $K_e$ or different combination of decryption key(s).

Preferably, the decryption keys Ke are stored non-persistently. In other words, the decryption key(s) exist in memory accessible to the playback module 144B only long enough for use in decrypting the content and are thereafter deleted or otherwise made unavailable for use. In embodiments in which the unwrapped license 116 is stored in the secure license memory 140, playing back the same content at a later time is accomplished by obtaining the encrypted decryption key from the unwrapped license, and decrypting the key(s) using the ROM controller secret 150B. In embodiments in which the licenses are stored in a wrapped state, the license must be unwrapped (decrypted) using the ROM certificate 118B before the encrypted decryption key(s)

$$E_{K_{S_{ROM}}} K_e$$

ROM may be obtained.

Generally speaking, the ROM device 154 described above can be any device that reads data from a removable ROM media 136. The ROM device 154 may be incorporated within a home computer or may be a separate stand-alone device such as a Blu-Ray optical disc player. To account for the possibility for standalone devices that have separate playback modules, FIGS. 2-5 illustrate the use of both a ROM playback module 144B and a RWM playback module 144A. However, it should be understood that if the ROM device 154 and RWM device 152 are both integrated into the same processing device, a single playback module may be used to decrypt and playback content from both the ROM media 134 and the RWM media 128.

Figure 4:
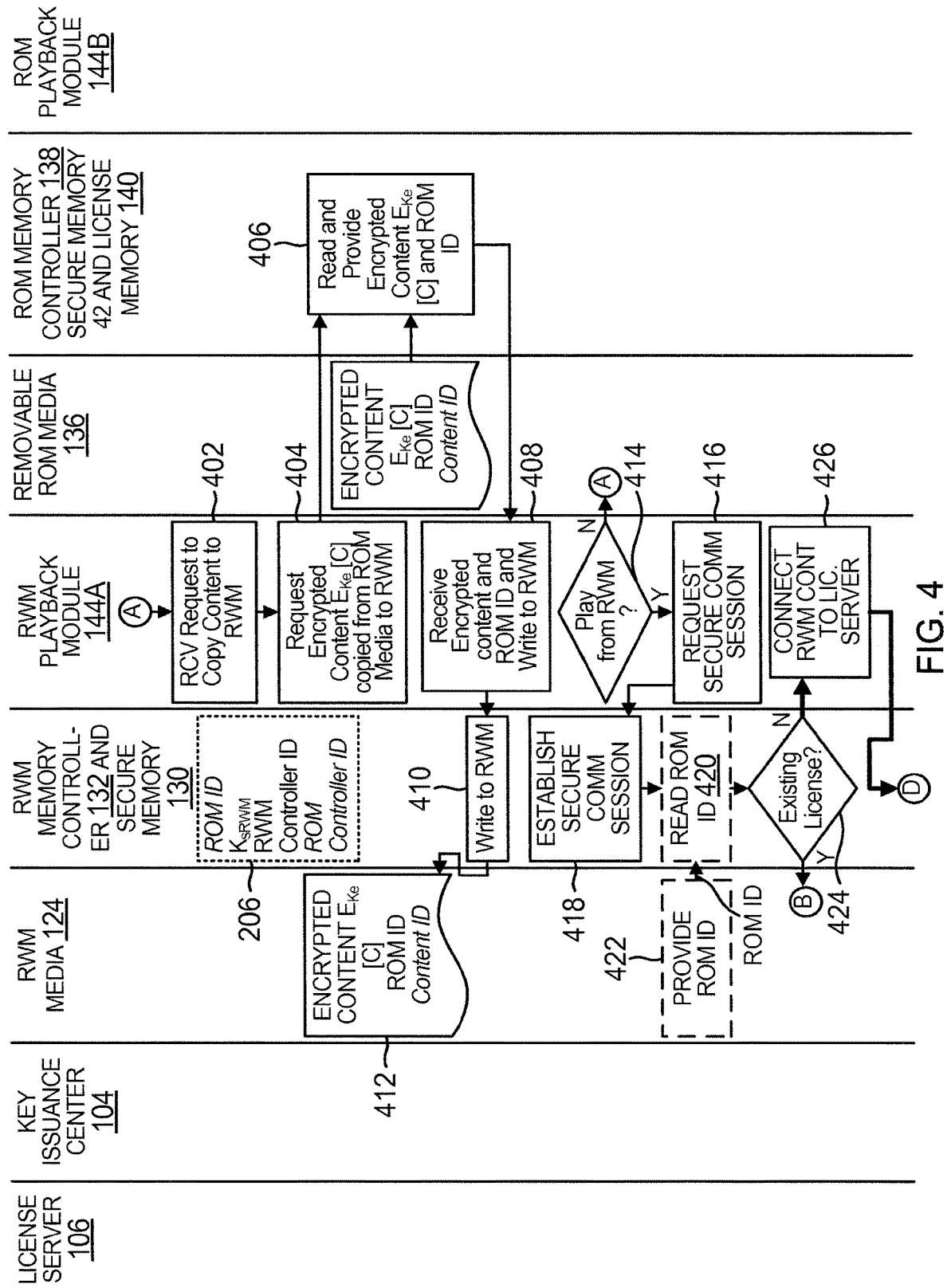
FIGS. 4-5 are flow charts illustrating exemplary processes for copying content from a removable read only memory to a read/writeable memory and for enabling the playback of the content therefrom.

FIG. 4 is a diagram of how the content stored on the removable ROM 143 may be copied to a RWM device 152 for subsequent storage and playback. The RWM device 152 can be any device for reading and writing data to media that has an integral (non -removable) controller, but in the illustrated embodiment, it is presumed that the ROM device 154 and RWM device both part coupled to a processing device such as a home computer.

In block 402, a request to copy the content to the RWM device 152 is received in the RWM playback module 144A. In block 404, RWM playback module 144A requests that the encrypted content 120E be copied from the removable ROM media 136 to the RWM media 124. The request is processed by the operating system (OS) of the computer, which generates a request for the ROM device 154 to provide the encrypted content and the ROM ID for storage elsewhere. Responding to such OS commands, the ROM controller 138 reads the encrypted content and the ROM ID from the removable ROM media 138, and provides the encrypted content and ROM ID to the RWM playback module 144A, as shown in block 406. The RWM playback module 144A receives the encrypted content and ROM ID, and instructs the RWM controller 132 to write the encrypted content to the RWM media 124, as shown in block 410. The ROM ID 136 may also be written to the RWM media 124, either as a separate data value, or by watermarking the encrypted content with the ROM ID, thus binding the ROM ID to the encrypted content. The ROM ID may also be stored in the ROM controller secure memory 130 or in another secure memory accessible to the RWM controller 132 as well.

Since the encrypted content 120E cannot be decrypted without the appropriate decryption key (s), the foregoing steps may be repeated to copy the encrypted content 120E to other RWM devices 152 as well.

After or while the encrypted content 120E is copied to the RWM 124, the RWM playback module 144A receives a request to play the encrypted content 120E from the RWM media 124, as shown in block 414. In response to such a request, the RWM playback module 144A and the RWM controller 132 establish a secure communication link, as shown in blocks 416 and 418. The ROM ID is then retrieved as shown in blocks 420 and 422. The RWM controller 138 checks to determine if there is an existing license to play the encrypted content. If such a license exists, processing is routed to block 512 (for licenses stored "wrapped"), and block 516 of FIG. 5 (for licenses stored "unwrapped"). If not, processing is routed to block 426, in which the RWM playback module 144A initiates the process to connect the RAM controller 132 to the license server 106.

Figure 5:
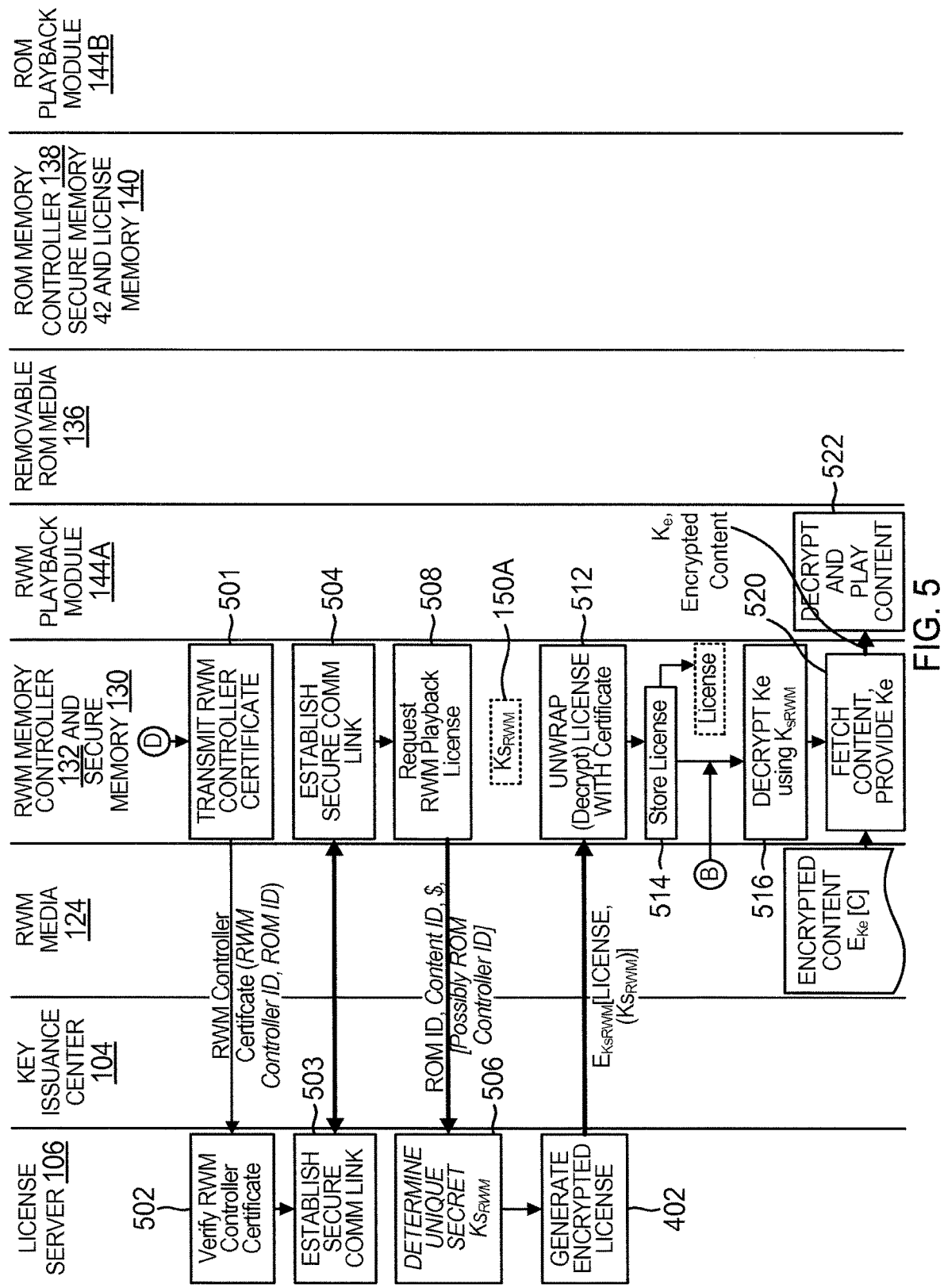

Turning to FIG. 5, the RWM controller 132 transmits its RWM controller certificate 118A to the license server 106 to request the establishment of a secure communications link, as shown in block 501. As the phrase is used herein, a "secure communications link" is implemented one or more measures to render the transmitted message indecipherable to any entity other than the intended entity. Typically, this is accomplished by encrypting messages before transmission using symmetric or asymmetric encryption techniques, or by use of a shared secret. The license server 106 verifies the RAM controller certificate 118A, and if found valid, establishes a secure communications link with the RWM controller 132, as shown in blocks 502-504. If a license request having the RWM controller ID and the ROM ID 136 were not implicit in the secure communications request, the RWM controller 132 then transmits request for a license to playback the content from the RWM media 124, as shown in block 508. The license server 106 receives the request, determines the RWM controller secret 150A associated with the identified RWM controller ID, and generates an encrypted license, as shown in blocks 508 and 510. As was the case in generating the playback license for the ROM device 154, this can comprise encrypting the key(s) needed to decrypt the encrypted content 120E with the RWM controller secret 150A and wrapping (encrypting) the result according to the RWM controller certificate 118A before transmitting the result to the RWM memory controller 132.

The RWM memory controller 132 unwraps the license using its RWM certificate 118A, as shown in block 512. As was the case with the ROM device 154, the wrapped (encrypted) license may be stored in the RWM controller secure memory 130, or the unwrapped license may be stored in the RWM controller secure memory 130 for later use, as shown in block 514. The RWM controller 132 then decrypts the encrypted content decryption key Ke recovered from the license to recover the key(s) themselves, as shown in block 516. The RWM controller 132 then fetches the encrypted content 120E from the RWM media 124, and provides the fetched content and the keys to the RWM playback module 144A, as shown in block 520. The RWM playback module 144A then decrypts the content using the provided key(s), and plays the decrypted content, as shown in block 522. As was the case with the ROM device 154 playback, it is important that the decryption key(s) be provided via, a secure communication path, to assure that they are not compromised. However, the encrypted content 120E may be provided on an unsecure communications link, as the content is already encrypted.

Since the RWM device 152 has a limited memory and content tiles are typically large, the RWM secure memory 130 need not be large in order to accommodate all of the content files likely to be stored on the same RWM media.

However, the ROM device 154, by virtue of the removability of the media itself, may need to store a large number of licenses for each optical disc inserted. The foregoing paradigm allows the ROM controller secure memory 142 to delete licenses on a first-in-first-out or "least frequently used" basis to accommodate this difference, since a replacement license may be obtained from the license server 106 it needed.

Applications

The foregoing technique of portably binding license rights to the controller reading the content and binding the controller to the media storing the content takes advantage of the reality that devices for playing such media have almost uniform access to license servers via emerging ubiquitous communication means such as Wi-Fi, 3G, 4G and LTE and other networks offering Internet connectivity.

In the basic paradigm, the viewer purchases a removable ROM 136 such as an optical disc that they would like to be able to play on any optical disc player. At the same time, the content distributor would like to prevent unauthorized viewing of the content. In the above described paradigm, the content is distributed in encrypted form, and therefore cannot be played back until the player is able to obtain the key(s) necessary to play back the media. When the customer inserts the purchased optical disc into their optical disc player at home, the optical disc player controller 132 reads the unique ROM ID associated with the optical disc, and provides this ROM ID along the an ID of the controller of the optical disc player to a licensing server 106, which looks up a secret shared with the controller 132 of the optical disc player, encrypts the decryption key(s) with that secret, and transmits license with that encrypted decryption key to the optical disk player. Only that particular optical disc player will be able to replay the content from the inserted media, because only the particular optical disc player will have the correct secret enabling it to decrypt the encryption keys and use them for playback. The optical disk player may also store the license (along with the encrypted decryption keys) for later use.

The customer may then take the same optical disc to a second home. Following the same paradigm as ted above, the customer inserts the optical disk into a second optical disc player, which provides a second ROM controller ID and the same ROM ID to the license server. The license server may check to determine if any licenses have been issued in connection with the ROM ID, and decide, based upon purchases made by the consumer or other factors, whether to issue another license and whether to cancel existing licenses or set an expiration date for such existing licenses. In the above example, if the user has paid for playback on only one optical disc player, the request for a license may be denied, or the license issued to the first optical disc player may be canceled, and a second license issued to the controller of the second optical disk player.

If the first optical disc player has stored the license for later use, a message from the licensing center may be issued having a list of revoked licenses, which may include the first license issued to the first optical disc player. Using the revoked license feature, licenses may also be granted fora. limited time or with other limitations. This may require at least occasional communication between the original optical disk player and the license server 106. While this revocation may be circumvented by communicatively disconnecting the optical disk player and the license server 106, the user will be unable to play any other optical disks (with other content encrypted and secured as described above) until such communication connectivity is re-established. Further, the optical disk controller may be configured such that any stored license must be reconfirmed via communication with the license server 106 before playback can commence (or require occasional reconfirmation). This prevents any playback using an expired license.

The paradigm also permits the customer to make copies of the content, for example on a HDD of a personal computer or memory of another processing device.. The ROM ID and the HDD controller ID are transmitted to the license server. Using the HDD controller ID, the license server looks up the HDD controller secret $^{K_S}RWM$, and encrypts the encryption keys K, needed to decrypt the content so as to be decryptable only by the HDD controller secret $^{K_S}RWM$, thus preparing a license for playback by the HDD controller. As was the case with playback by the second optical disc player, the license server may cancel or restrict the already issued licenses, or may offer an additional license to the customer at an additional cost.

If an unauthorized user attempts to copy the copy made on the HDD on another media, that copy will not be playable unless the player has the appropriate decryption key. To obtain the key, the unauthorized copy w be required to present its ROM ID and the ID of the unauthorized HDD to the license server, at which time the license server may grant the request, or deny it. In most situations, since it is desirable to restrict copying and dissemination of digital data to a plurality of HDDs, the license will be denied unless. further payment is made, and any further playback on an optical disc player is denied, or the license to the initially licensed HDD may be revoked before providing a license to the second HDD.

This paradigm has a benefit of providing "super-distribution" of the content on the media. Typically, the content itself is large and difficult to transmit remotely, even in communication links with high bandwidth. Also, the storage of such programs requires a lot of memory. Because it is encrypted, the tangible copies of the content may be widely disseminated, and hence, convenient for customers to copy and pass on to others, or keep for themselves. Only when the customer wants to play the content is a license required.

Hence, this paradigm supports unique distribution models. For example, patrons of a movie may be given free copies of the encrypted content on tangible media. They may then bring these copies home and using the steps outlined above, obtain a license to the media and play it at home for an additional fee or other compensation. Some of the content on the media may also comprise content in addition to the movie title, such as games, or deleted scenes. Such additional content may be provided in encrypted or plaintext for as desired. The recipients of such tangible media may copy the content to their HDD and provide the tangible media to others to do the same, thus "super-distributing" the content and avoiding the high bandwidth communication links that would otherwise be required (the license and data exchange required to play back the media is several orders of magnitude less than the content itself).

The foregoing distribution model also has the benefit of using a single file structure for all copies, no matter how distributed. Currently, content owners typically distribute content in different protocols, and each has to be created and supported by the content provider. For example, iTunes may use a different file structure or digital rights management protocol than Amazon. The foregoing ameliorates this problem because every copy of the content itself (but not the ROM ID) is identical to the others.

Hardware Environment

Figure 6:
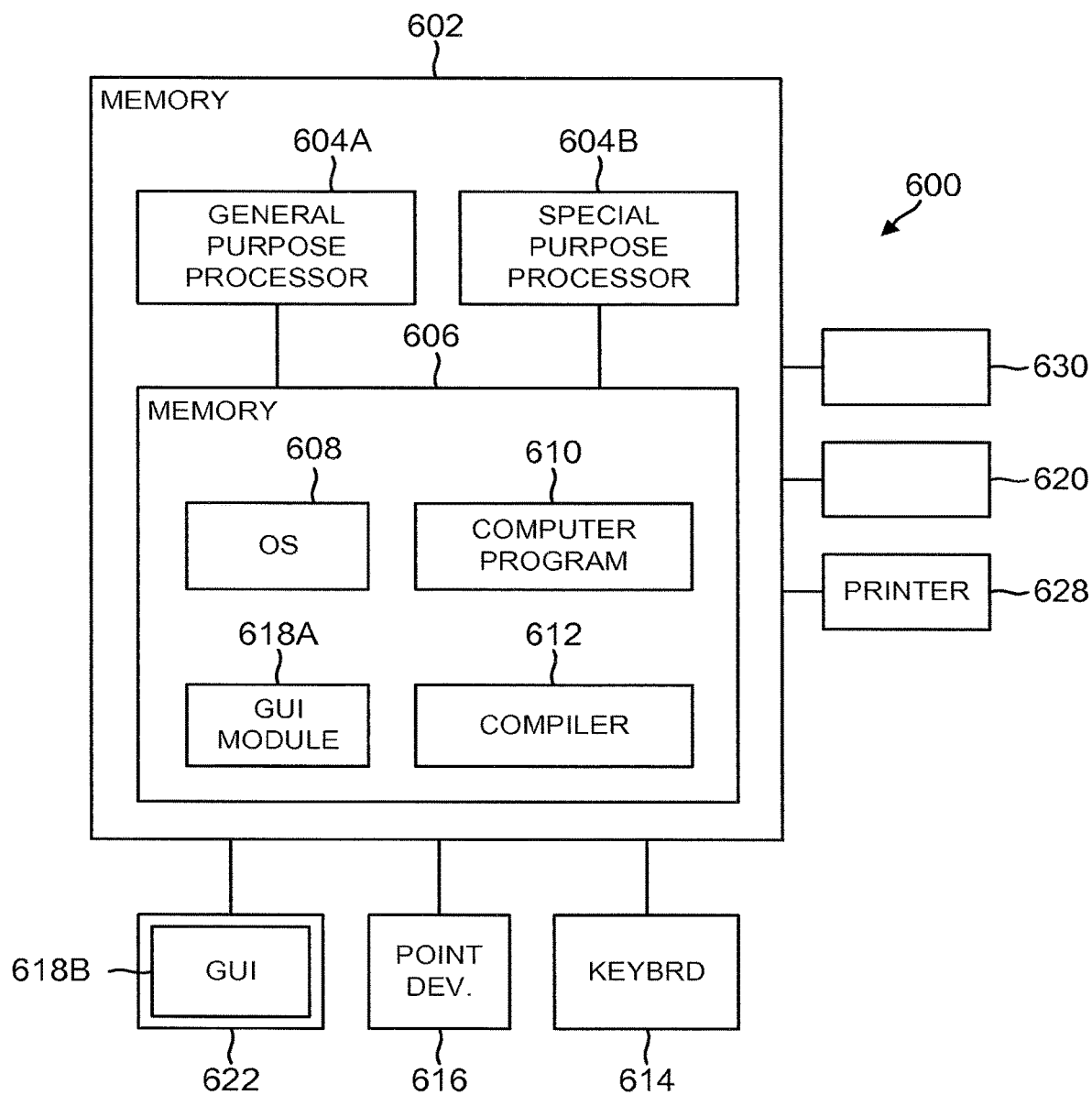
FIG. 6 is a diagram of a computer processing device that can be used to implement elements of the content delivery system.

FIG. 6 is a diagram illustrating an exemplary computer system 600 that could be used to implement elements of the present invention. The computer 602 comprises a general purpose hardware processor 604A and/or a special purpose hardware processor 604B (hereinafter alternatively collectively referred to as processor 604) and a memory 606, such as random access memory (RAM). The computer 602 may be coupled to other devices, including input/output (I/O) devices such as a keyboard 614, a mouse device 616 and a printer 628.

In one embodiment, the computer 602 operates by the general purpose processor 604A performing instructions defined by the computer program 610 under control of an operating system 608. The computer program 610 and/or the operating system 608 may be stored in the memory 606 and may interface with the user and/or other devices to accept input and commands and, based on such input and commands and the instructions defined by the computer program 610 and operating system 608 to provide output and results.

Output/results may be presented on the display 622 or provided to another device for presentation or further processing or action. In one embodiment, the display 622 comprises a liquid crystal display (LCD) having a plurality of separately addressable pixels formed by liquid crystals. Each pixel of the display 622 changes to an opaque or translucent state to form a part of the image on the display in response to the data or information generated by the processor 604 from the application of the instructions of the computer program 610 and/or operating system 608 to the input and commands. Other display 622 types also include picture elements that change state in order to create the image presented on the display 622. The image may be provided through a graphical user interface(GUI) module 618A. Although the GUI module 618A is depicted as a separate module, the instructions performing the GUI functions can be resident or distributed in the operating system 608, the computer program 610, or implemented with special purpose memory and processors.

Some or all of the operations performed by the computer 602 according to the computer program 610 instructions may be implemented in a special purpose processor 604B. In this embodiment, some or all of the computer program 610 instructions may be implemented via firmware instructions stored in a read only memory (ROM), a programmable read only memory (PROM) or flash memory within the special purpose processor 604B or in memory 606. The special purpose processor 604B may also be hardwired through circuit design to perform some or of the operations to implement the present invention. Further, the special purpose processor 604B may be a hybrid processor, which includes dedicated circuitry for performing a subset of functions, and other circuits for performing more general functions such as responding to computer program instructions. In one embodiment, the special purpose processor is an application specific integrated circuit (ASIC).

The computer 602 may also implement a compiler 612 which allows an application program 610 written in a programming language such as COBOL, C++, FORTRAN, or other language to be translated into processor 604 readable code. After completion, the application or computer program 610 accesses and manipulates data accepted from I/O devices and stored in the memory 606 of the computer 602 using the relationships and logic that was generated using the compiler 612.

The computer 602 also optionally comprises an external communication device such as a modem, satellite link, Ethernet card, or other device for accepting input from and providing output to other computers.

In one embodiment, instructions implementing the operating system 608, the computer program 610, and/or the compiler 612 are tangibly embodied in a computer-readable medium, e.g., data storage device 620, which could include one or more fixed or removable data storage devices, including one or more of the ROM devices 154 and RWM devices 152 discussed above. Such devices could include a zip drive, floppy disc drive 624, hard drive, CD-ROM drive, RW-CD-ROM drive, Blue-Ray device, tape drive, or a flash drive. Further, the operating system 608 and the computer program 610 are comprised of computer program instructions which, when accessed, read and executed by the computer 602, causes the computer 602 to perform the steps necessary to implement and/or use the present invention or to load the program of instructions into a memory, thus creating a special purpose data structure causing the computer to operate as a specially programmed computer executing the method steps described herein. Computer program 610 and/or operating instructions may also be tangibly embodied in memory 606 and/or data communications devices 630, thereby making a computer program product or article of manufacture according to the invention. As such, the terms "article of manufacture," "program storage device" and "computer program product" or "computer readable storage device" as used herein are intended to encompass a computer program accessible from any computer readable device or media.

Of course, those skilled in the art will recognize that any combination of the above components, or any number of different components, peripherals, and other devices, may be used with the computer 602.

Although the term "computer" is referred to herein, it is understood that the computer may include portable devices such cellphones, portable MP3 players, video game consoles, notebook computers, pocket computers, or any other device with suitable processing, communication, and input/output capability.

Conclusion

This concludes the description of the preferred embodiments of the present invention. The foregoing description of the preferred embodiment of the invention has been presented for the purposes of illustration and description. It is not intended to be exhaustive or to limit the invention to the precise form disclosed. Many modifications and variations are possible in light of the above teaching. For example, while the foregoing illustrates communications between the controllers and the license server, it should be understood that communications with the license server may be made through the playback modules or other elements.

It is intended that the scope of the invention be limited not by this detailed description but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method of for use by a playback system to playback encrypted content stored in a read-only memory (ROM) having a ROM identifier (ID), the method comprising:

receiving a command to copy the encrypted content from the ROM to a random access memory (RAM), the RAM written to and read from under control of a RAM controller having a RAM controller ID;

copying, in response to the command, the encrypted content from the ROM to the RAM;

copying, in response to the command, the ROM ID from the ROM to the RAM or another memory accessible by the RAM controller;

transmitting a RAM playback license request from the RAM controller to a license server, the RAM playback license request comprising the RAM controller ID, the ROM ID and a request for a content license to play back the encrypted content from the RAM using the RAM controller;

receiving the content license enabling one or more rights to the encrypted content including a right for the playback of the encrypted content from the RAM using the RAM controller, the content license including one or more content keys and being encrypted to be decryptable according to a RAM controller secret associated with the RAM controller ID;

decrypting the content license by the RAM controller, according to the RAM controller secret associated with the RAM controller ID, to recover and provide the one or more content keys to a playback module;

decrypting, using the playback module, the encrypted content using the one or more content keys to generate a decrypted content; and playing back, using the playback module, the decrypted content.

2. The method of claim 1, wherein the RAM controller secret is unchangeably and securely stored in the RAM by the RAM controller, and wherein the RAM is a secure RAM.

3. The method of claim 1, wherein the RAM controller secret is stored in a ROM controller.

4. The method of claim 1, wherein the one or more content keys are provided by the RAM controller via a secure communications link for decrypting the encrypted content.

5. The method of claim 1, further comprising:
obtaining a RAM controller digital certificate for the RAM controller and a playback module digital certificate for the playback module, the RAM controller digital certificate and the playback module digital certificate being configured for use in establishing a secure communications channel between the RAM controller and the playback module.

6. The method of claim 1, wherein the one or more content keys are impersistently stored in the RAM controller and the playback module only for a duration to permit the playing back of the decrypted content.

7. The method of claim 6, wherein the content license specifies the duration.

8. The method of claim 1, wherein the RAM playback license request is transmitted via a secure communications link, and wherein the RAM playback license request further comprises a content ID that identifies the encrypted content, and the method further comprising determining whether to grant the content license based on the content ID.

9. The method of claim 1,
wherein the license server grants the content license to the playback system based at least in part upon the RAM controller ID, and wherein
receiving the content license, from the license server, is in response to the license server granting the content license to the playback system.

10. The method of claim 9, wherein the content license is further granted to the playback system based at least in part upon the ROM controller ID.

11. A playback system for playing back encrypted content stored in a read-only memory (ROM) having a ROM identifier (ID), the playback system comprising:
a random access memory (RAM); and
a RAM controller, the RAM written to and read from under control of the RAM controller having a RAM controller ID;
the playback system configured to execute computer instructions to:
receive a command to copy the encrypted content from the ROM to the RAM;
copy, in response to the command, the encrypted content from the ROM to the RAM;
copy, in response to the command, the ROM ID from the ROM to the RAM or another memory accessible by the RAM controller;
transmit a RAM playback license request from the RAM controller to a license server, the RAM playback license request comprising the RAM controller ID, the ROM ID and a request for a content license to play back the encrypted content from the RAM using the RAM controller;
receive the content license enabling one or more rights to the encrypted content including a right for the playback of the encrypted content from the RAM using the RAM controller, the content license including one or more content keys and being encrypted to be decryptable according to a RAM controller secret associated with the RAM controller ID;
decrypt the content license by the RAM controller, according to the RAM controller secret associated with the RAM controller ID, to recover and provide the one or more content keys to a playback module;
decrypt, using the playback module, the encrypted content using the one or more content keys to generate a decrypted content; and
play back, using the playback module, the decrypted content.

12. The playback system of claim 11, wherein the RAM controller secret is unchangeably and securely stored in the RAM by the RAM controller, and wherein the RAM is a secure RAM.

13. The playback system of claim 11, wherein the RAM controller secret is stored in a ROM controller.

14. The playback system of claim 11, wherein the one or more content keys are configured to be provided by the RAM controller via a secure communications link configured for decrypting the encrypted content.

15. The playback system of claim 11, wherein the playback system is further configured to execute the computer instructions to:
obtain a RAM controller digital certificate for the RAM controller and a playback module digital certificate for the playback module, the RAM controller digital certificate and the playback module digital certificate being configured for use in establishing a secure communications channel between the RAM controller and the playback module.

16. The playback system of claim 11, wherein the one or more content keys are impersistently stored in the RAM controller and the playback module only for a duration to permit the playing back of the decrypted content.

17. The playback system of claim 16, wherein the content license specifies the duration.

18. The playback system of claim 11, wherein the playback system is configured to execute the computer instructions to transmit the RAM playback license request via a secure communications link, and wherein the RAM playback license request further comprises a content ID that identifies the encrypted content, and the license server is configured to grant the content license to the playback system based on the content ID.

19. The playback system of claim 11, wherein
the license server is configured to grant the content license to the playback system based at least in part upon the RAM controller ID.

20. The playback system of claim 19, wherein the license server is further configured to grant the content license to the playback system based at least in part upon the ROM controller ID.

* * * * *